United States Patent [19]
Lee

[11] Patent Number: 5,962,978
[45] Date of Patent: Oct. 5, 1999

[54] APPARATUS FOR AUTOMATICALLY DEGAUSSING A COLOR PICTURE TUBE IN RESPONSE TO A POWER CONSERVATION MODE

[75] Inventor: Kwang Ho Lee, Kyoungsangbuk-Do, Rep. of Korea

[73] Assignee: LG Electronics Inc., Seoul, Rep. of Korea

[21] Appl. No.: 08/943,569

[22] Filed: Oct. 3, 1997

[30] Foreign Application Priority Data

Jul. 10, 1996 [KR] Rep. of Korea ................. 96-44443

[51] Int. Cl.⁶ ..................................... H01F 13/00
[52] U.S. Cl. ......................... 315/8; 361/150; 361/165; 307/101
[58] Field of Search .............. 315/8, 85; 361/150, 361/165, 151, 154, 267; 307/101

[56] References Cited

U.S. PATENT DOCUMENTS

| | | | |
|---|---|---|---|
| 5,168,195 | 12/1992 | Breidigan et al. | 315/8 |
| 5,241,448 | 8/1993 | Stolte | 315/8 |
| 5,510,682 | 4/1996 | Park | 315/8 |
| 5,526,221 | 6/1996 | An | 361/149 |
| 5,604,403 | 2/1997 | Levy et al. | 315/8 |

FOREIGN PATENT DOCUMENTS

| | | |
|---|---|---|
| 0492314A2 | 12/1991 | European Pat. Off. . |
| 0492314A3 | 12/1991 | European Pat. Off. . |
| 2080077 | 5/1981 | United Kingdom . |
| 8301476 | 4/1984 | WIPO . |
| WO8401486 | 4/1984 | WIPO . |

*Primary Examiner*—Michael B Shingleton
*Attorney, Agent, or Firm*—Oppenheimer Wolff & Donnelly LLP

[57] ABSTRACT

An automatic degaussing circuit for a color picture tube (CPT) capable of automatically degaussing the CPT when a power conservation mode is released in a monitor having a power conservation function. The degaussing circuit includes a degaussing coil for eliminating electromagnetic waves produced from the CPT, a power conservation mode detecting section for detecting the release of the power conservation mode in accordance with a power conservation mode signal of the CPT inputted thereto and providing a degaussing control signal for controlling the operation of the degaussing coil if the release of the power conservation mode is detected, and a degaussing coil driving section for driving the degaussing coil for a predetermined time in accordance with the degaussing control signal when the power conservation mode is released.

6 Claims, 2 Drawing Sheets

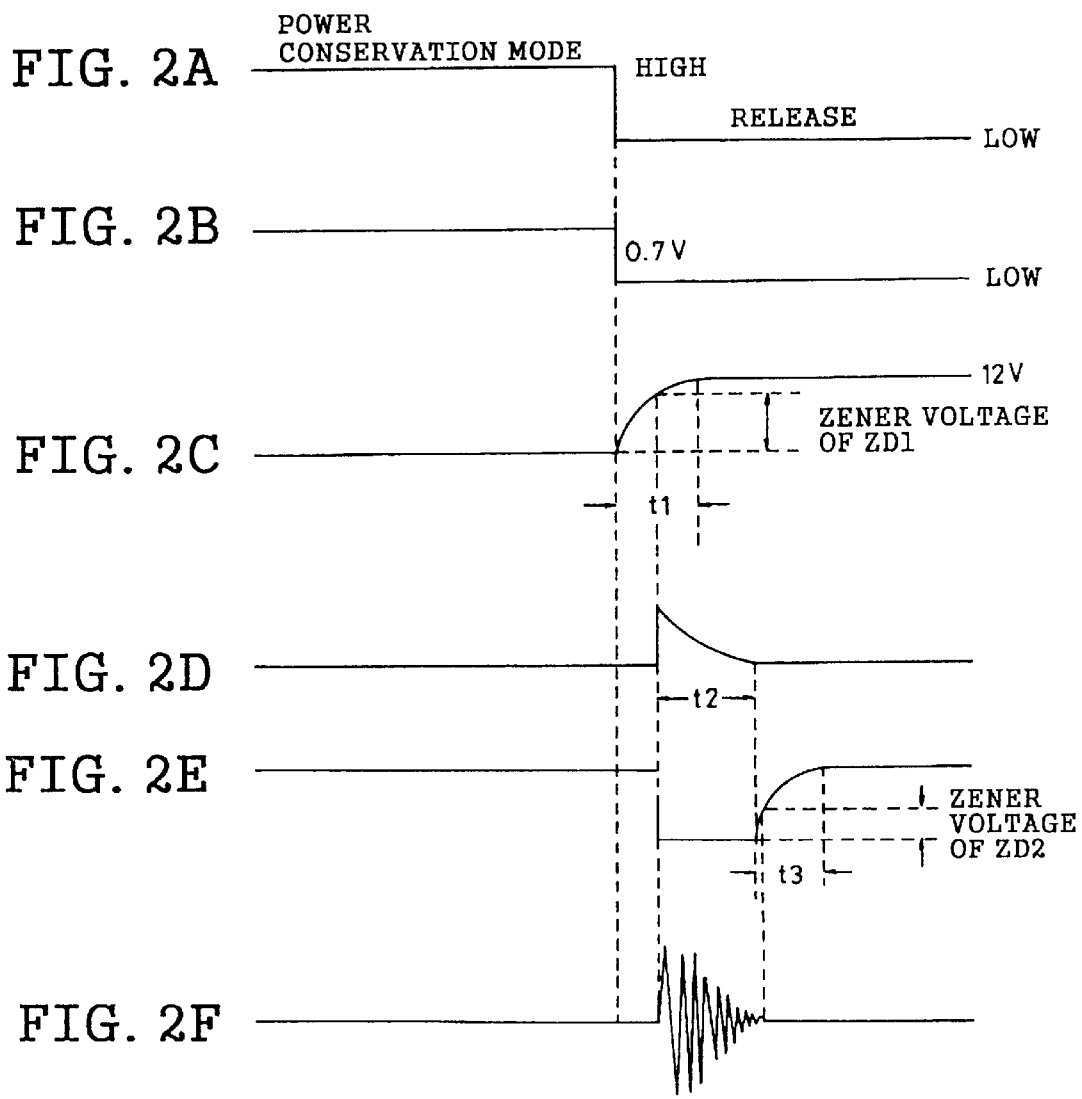

APPARATUS FOR AUTOMATICALLY DEGAUSSING A COLOR PICTURE TUBE IN RESPONSE TO A POWER CONSERVATION MODE

BACKGROUND OF THE INVENTION

1. Field of the Invention

The present invention relates generally to a color picture tube of a monitor. In particular, the present invention relates to a degaussing circuit for a color picture tube (CPT) which can automatically degauss the CPT when a power conservation mode of the monitor is released.

2. Description of the Prior Art

Generally, in a CPT, electron beams which have been emitted from a cathode heated by a heater are controlled, accelerated, focused, and then strike phosphor dots on a fluorescent screen of the CPT to display a video signal. During these processes, electromagnetic waves are produced from the CPT, and exert harmful influence upon the peripheral circuits of the CPT and the human body. Accordingly, in order to eliminate such electromagnetic waves, the CPT is provided with a degaussing device for degaussing the electromagnetic field which is instantaneously produced especially when the power is initially supplied.

According to a conventional degaussing device, if a power switch is turned on and an initial power is supplied to the CPT, the degaussing device operates for a predetermined time to degauss the electromagnetic waves produced from the CPT. As a result, the degaussing device performs the degaussing operation only when the power in initially supplied, and then will not perform the degaussing operation until the initial power is supplied again after the power is off.

Recently, most video display appliances such as monitors employ a power conservation function for preventing unnecessary power consumption of the appliance. Thus, during a normal operation of the appliance wherein a power conservation mode is released, the degaussing operation is not performed without actuating a separate degaussing switch. If such a degaussing switch is not provided on the appliance, the electromagnetic waves produced from the CPT cannot be eliminated at all during normal operation of the CPT.

SUMMARY OF THE INVENTION

It is an object of the present invention to solve the problems involved in the prior art, and to provide a degaussing circuit which can automatically perform the CPT degaussing operation when the power conservation mode is released regardless of the on/off state of the degaussing switch.

In order to achieve the above object, there is provided a degaussing circuit for a CPT having a degaussing coil for eliminating electromagnetic waves, the degaussing circuit comprising a power conservation mode detecting section for detecting a release of a power conservation mode in accordance with a power conservation mode signal of the CPT inputted thereto and providing a degaussing control signal for controlling an operation of the degaussing coil if the release of the power conservation mode is detected, and a degaussing coil driving section for driving the degaussing coil for a predetermined time in accordance with the degaussing control signal inputted from the power conservation mode detecting section when the power conservation mode is released.

BRIEF DESCRIPTION OF THE DRAWINGS

The above object, other features and advantages of the present invention will become more apparent by describing the preferred embodiment thereof with reference to the accompanying drawings, in which:

FIG. 2A to 2F are waveform diagrams illustrating the waveforms appearing at various points of FIG. 1.

DETAILED DESCRIPTION OF THE PREFERRED EMBODIMENT

Figure 1:
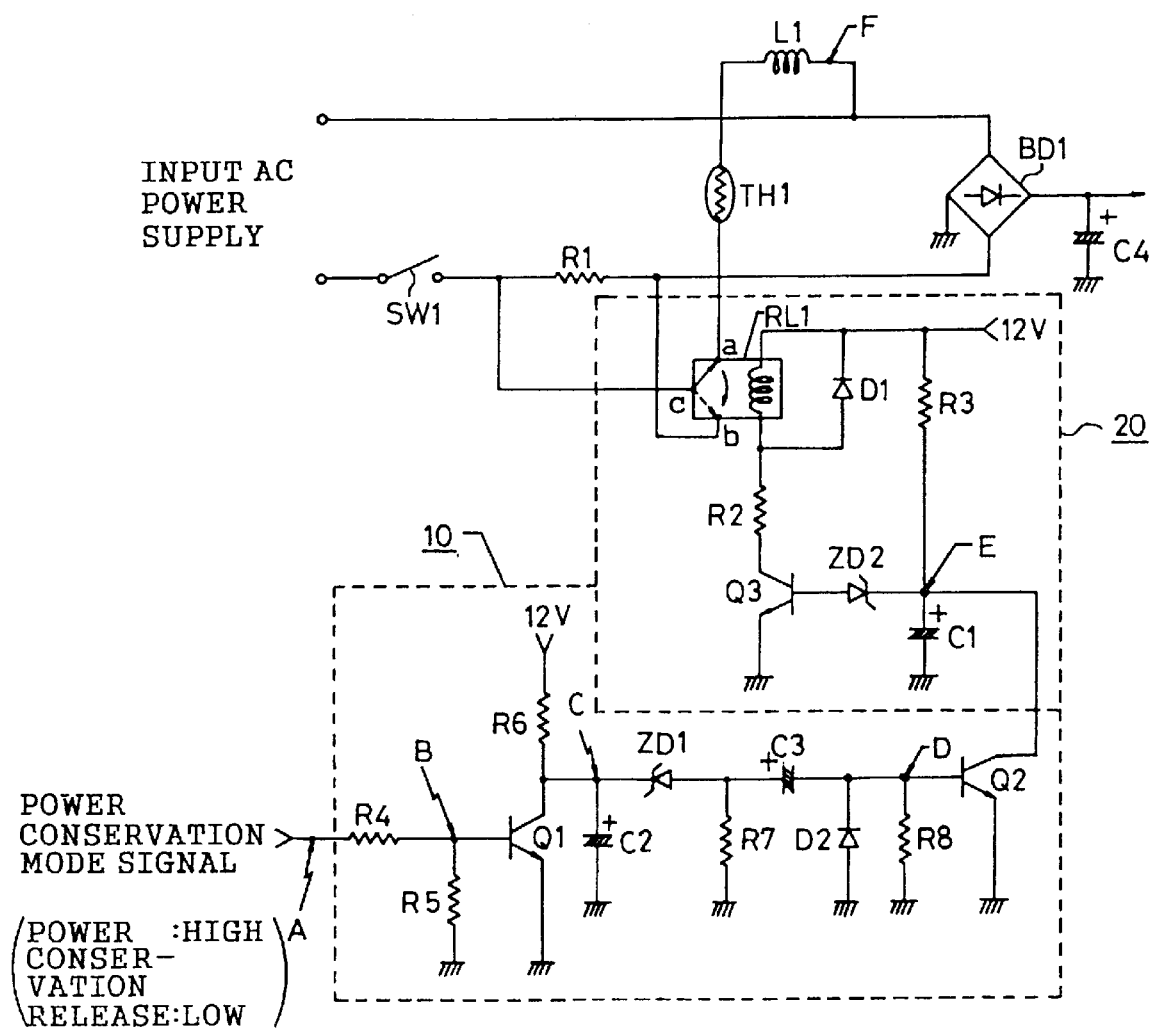
FIG. 1 is a schematic circuit diagram of the automatic degaussing circuit for a CPT according to the present invention.

FIG. 1 shows the construction of the automatic degaussing circuit for a CPT according to the present invention.

Referring to FIG. 1, the automatic CPT degaussing circuit according to the present invention includes a degaussing coil L1, installed on a proper portion of the CPT, for degaussing electromagnetic waves produced from the CPT, a thermistor TH1, one terminal of which is connected to one terminal of the degaussing coil L1, for controlling the amount of current flowing to the degaussing coil L1, a bridge rectifying section BD1, coupled between the other terminal of the degaussing coil L1 and one terminal of a power switch SW1, for rectifying an input AC power supply, a power conservation mode detecting section 10 for detecting a release of a power conservation mode in accordance with a power conservation mode signal inputted thereto from a power conservation circuit (not illustrated) of the CPT, and outputting a degaussing control signal for controlling the operation of the degaussing coil L1 if the release of the power conservation mode is detected, and a degaussing coil driving section for driving the degaussing coil L1 for a predetermined time in accordance with the degaussing control signal inputted from the power conservation mode detecting section 10 when the power conservation mode is released.

The power conservation mode detecting section 10 includes a transistor Q1 for performing a switching operation according to the power conservation mode signal, a Zener diode ZD1 for passing therethrough a voltage supplied by the switching operation of the transistor Q1 only when the voltage is higher than the Zener voltage thereof to prevent the erroneous operation of the power conservation mode detecting section 10, a transistor Q2 for performing a switching operation in accordance with the voltage supplied through the Zener diode ZD1, a resistor R8 and a capacitor C3, connected between the anode of the Zener diode ZD1 and the base of the transistor Q2, for determining a switching timing of the transistor Q2. A bias voltage of 12 V is supplied to the collector of the transistor Q1 and the cathode of the Zener diode ZD1 through a resistor R6.

Meanwhile, the degaussing coil driving section 20 includes a relay RL1, whose movable contacts are aonnected to one terminal of the thermistor TH1 and one terminal of the power switch SW1, respectively, for controlling the voltage supplied to the degaussing coil L1 through the thermistor TH1, a eoner diode ZD2, coupled to the output terminal of the power conservation mode detecting section 10, for passing therethrough a voltage supplied by the output of the power conservation mode detecting section 10 only when the voltage is higher than the Zener voltage thereof, and a transistor Q3, connected to a driving coil of the relay RL1, for controlling the operation of the relay RL1 in accordance with the voltage supplied through the Zoner diode ZD2. The bias voltage of 12 V is supplied to the other terminal of the driving coil of the relay RL1 and the cathode of the Zoner diode ZD2.

In FIG. 1, the reference numeral R1 denotes a resistor for the prevention of rush current, R1 to R7 denote resistors, and C1, C2, and C4 denote capacitors.

The operation of the CPT degaussing circuit according to the present invention as constructed above will now be explained in detail with reference to FIGS. 1, 2A to 2F.

Referring to FIG. 1, if the power switch SW1 is turned on, the common contact c of the relay RL1 is in contact with the movable contact a at an initial state, and thus, as shown in FIG. 2A, a degaussing coil driving voltage is supplied to the degaussing coil L1 through the thermistor TH1. Accordingly, the degaussing coil L1 is driven to perform the degaussing operation.

Specifically, at the initial state of the CPT, the transistor Q2 in the power conservation mode detecting section 10 is turned off, while the transistor Q3 in the degaussing coil driving section 20 is turned on. Accordingly, a driving voltage is supplied to the driving coil of the relay RL1, causing the common contact c of the relay RL to become in contact with the movable contact a. Thus, the degaussing coil driving voltage is supplied to the degaussing coil L1 through the contacts of the relay RL1 and the thermistor TH1, so that the degaussing coil L1 performs the degaussing operation.

In this state, if the resistance value of the thermistor TH1 increases as a predetermined tire elapses, no more operating current flows to the degaussing coil L1 through the thermistor TH1, causing the operation of the degaussing coil L1 to stop.

On the other hand, if the power conservation mode of the CPT is on, a 'high' level power conservation mode signal is inputted from the power conservation circuit of the CPT to the base of the transistor Q1 in the power conservation mode detecting section 10 through dividing resistors R4 and R5. Thus, the transistor Q1 is turned on, and the voltage of 12 V pass through the resistor R6 and the collector-emitter path of the transistor Q1. Accordingly, no voltage is applied to the cathode of the Zener diode ZD1, and a 'low'. level signal is applied to the base of the transistor Q2, causing the transistor Q2 to be turned off.

As the transistor Q2 in the power conservation mode detecting section 10 is turned off, the driving voltage is inputted to the abase of the transistor Q3 through the Zener diode ZD2 in the degaussing coil driving section 20, causing the transistor Q3 to be turned on, and thus the driving voltage flows to ground through the driving coil of the relay RL1 and the transistor Q3. Accordingly, the common contact c of the relay RL1 becomes in contact with the movable contact b, so that the power supply to the degaussing coil L1 through the thermistor TH1 is intercepted. As a result, during the power conservation mode of the CPT, the degaussing coil in not driven.

In this state, if the power conservation mode is released or turned off, a 'low' level power conservation mode signal as shown in FIG. 2A is applied to the base of the transistor Q1 in the power conservation mode detecting section 10, causing the transistor Q1 to be turned off. Thus, the collector voltage of the transistor Q1 increases as shown in FIG. 2C in accordance with the time constant of the resistor R6 and the capacitor C2.

Specifically, if the collector voltage of the transistor Q1 increases over the Zener voltage of the Zener diode ZD1, the Zener diode ZD1 is turned on, and the voltage having passed through the Zener diode ZD1 is applied to the base of the transistor Q2 as shown in FIG. 2D. Accordingly, the transistor Q2 is turned on, and thus the driving voltage supplied to the cathode of the Zener diode ZD2 in the degaussing coil driving section 20 flows through the transistor Q2 in the power conservation mode detecting section 10.

At this time, if the voltage charged in the capacitor C1 has been substantially discharged, the Zoner diode ZD2 and the transistor Q3 are sequentially turned off as shown in FIG. 2E, so that no driving current flows to the driving coil of the relay RL1, causing the common contact c of the relay RL1 to become in contact with the movable contact a. Accordingly, the degaussing coil driving voltage is supplied to the degaussing coil L1 through the contacts of the relay RL1 and the thermistor TH1, and thus the degaussing coil L1 is driven to perform the degaussing operation.

Here, the time period t1 as shown in FIG. 2C is determined by the resistor R6 and the capacitor C2, and the time period t2 as shown in FIG. 2D is determined by the resistor ka and the capacitor C3.

Thereafter, if the time period t2 has passed from the release of the power conservation mode, the transistor Q2 in the power conservation mode detecting section 10 is turned off since the capacitor C3 is fully charged by the current flowing to the capacitor C3 in the power conservation mode detecting section 10. As the transistor Q2 is turned off, the capacitor C1 in the degaussing coil driving section 20 is gradually charged in accordance with the time constant of the resistor R3 and the capacitor C1 as shown in FIG. 2E.

At this time, if the charged voltage of the capacitor becomes higher than the Zener voltage of the Zener diode ZD2, this Zener diode ZD2 is turned on, and the voltage through the Zener diode ZD2 is applied to the base of the transistor Q3, so that the transistor Q3 is turned on and the common contact c of the relay RL1 becomes in contact with the movable contact b. Accordingly, the degaussing coil driving voltage which is supplied to the degaussing coil L1 through the thermistor TH1 in intercepted to stop the degaussing operation of the degaussing coil L1. As a result, when the predetermined time elapses after the release of the power conservation mode, the operation of the degaussing coil L1 is automatically stopped.

Here, the Zener diode ZD1 in the power conservation mode detecting section 10 prevents the degaussing coil driving section 20 from its erroneous operation due to an instantaneous input of an abnormal pulse.

As described above, according to the present invention, the CPT is automatically degausmed for a predetermined time when the power conservation mode is released in a monitor having a power conservation function, thereby improving the capability and reliability of the monitor.

While the present invention has been described and illustrated herein with reference to the preferred embodiment thereof, it will be understood by those skilled in the art that various changes in form and details may be made therein without departing from the spirit and scope of the invention.

What is claimed is:

1. A monitor for a computer or the like, wherein the monitor includes:
   a color picture tube (CPT);
   a degaussing coil for degaussing the monitor;
   power conservation mode circuitry for placing the monitor in a low power consumption mode while primary power to the monitor is still turned on; and
   degaussing circuitry for detecting a release of said power conservation mode, and for providing a degaussing control signal for causing said degaussing coil to perform a degaussing operation in response to the release of the power conservation mode regardless of whether said primary power to said monitor has been cycled off and on, or not.

2. A circuit for controlling a color picture tube (CPT) having a degaussing coil, the circuit comprising:

a power conservation mode section for placing the CPT in a low power consumption mode while primary power to the CPT is still turned on, and for producing a power conservation mode signal; and a degaussing coil driving section for detecting a release of said power conservation mode and for driving said degaussing coil for a predetermined time in response to said release of the power conservation mode regardless of whether said primary power to said monitor has been cycled off and on, or not.

3. A circuit for controlling a CPT as claimed in claim 2, further comprising a thermistor, connected in series to said degaussing coil, for controlling current flow to said degaussing coil.

4. A circuit for controlling a CPT as claimed in claim 2, wherein said degaussing coil driving section further comprises:

a first transistor for performing a switching operation according to said power conservation mode signal;

a Zener diode for passing therethrough a voltage supplied in accordance with said switching operation of said first transistor only when said voltage is higher than a Zener voltage of said Zener diode to prevent an erroneous operation of said degaussing coil driving section; and a second transistor for performing a switching operation in accordance with said voltage supplied through said Zener diode.

5. A circuit for controlling a CPT as claimed in claim 2, wherein said degaussing coil driving section includes:

a relay for controlling power to said degaussing coil;

a Zener diode coupled to said power conservation mode section, for passing therethrough a voltage supplied in accordance with an output of said power conservation mode section only when said voltage is higher than a Zener voltage of said Zener diode; and a transistor, connected to said relay, for controlling an operation of said relay in accordance with said voltage supplied through said Zener diode.

6. A degaussing circuit for a color picture tube (CPT) having a degaussing coil, the degaussing circuit comprising:

a thermistor, connected to said degaussing coil, for controlling an amount of current flowing to said degaussing coil;

a relay, coupled to said thermistor, for controlling a driving voltage supplied to said degaussing coil through said thermistor;

power conservation mode circuitry for placing the CPT in a low power consumption mode while primary power to the CPT is still turned on; and a degaussing coil driving section for detecting a release of said power conservation mode and for driving said degaussing coil through said thermistor for a predetermined time in response to the release of the power conservation mode regardless of whether said primary power to said monitor has been cycled off and on, or not.

* * * * *